(12) United States Patent
Orakcilar et al.

(10) Patent No.: US 7,224,546 B1
(45) Date of Patent: May 29, 2007

(54) DISK DRIVE EMPLOYING A CALIBRATED BRAKE PULSE TO REDUCE ACOUSTIC NOISE WHEN LATCHING AN ACTUATOR ARM

(75) Inventors: Gokhan Orakcilar, Irvine, CA (US); Steven Nemshick, Santa Ana, CA (US); Ashok K. Desai, Westlake Village, CA (US); Robert P. Ryan, Mission Viejo, CA (US); Dean V. Dang, Fountain Valley, CA (US); Lakshman Rathnam, Mountain View, CA (US); Thomas A. Tacklind, San Martin, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 524 days.

(21) Appl. No.: 10/769,401

(22) Filed: Jan. 31, 2004

(51) Int. Cl.
*G11B 21/02* (2006.01)
*G11B 5/596* (2006.01)

(52) U.S. Cl. ..................... 360/75; 360/78.04
(58) Field of Classification Search ............... None
See application file for complete search history.

(56) References Cited

U.S. PATENT DOCUMENTS

| | | | |
|---|---|---|---|
| 4,864,437 A | 9/1989 | Couse et al. | |
| 5,568,333 A | 10/1996 | Bang | |
| 5,600,219 A | 2/1997 | Gomez | |
| 5,844,743 A | 12/1998 | Funches | |
| 6,028,744 A | 2/2000 | Amirkiai et al. | |
| 6,081,112 A | 6/2000 | Carobolante et al. | |
| 6,097,564 A | 8/2000 | Hunter | |
| 6,140,791 A | 10/2000 | Zhang | |
| 6,157,509 A * | 12/2000 | Ratliff ........................ | 360/75 |
| 6,212,027 B1 | 4/2001 | Lee et al. | |
| 6,222,696 B1 | 4/2001 | Kim | |
| 6,396,652 B1 | 5/2002 | Kawachi et al. | |
| 6,441,987 B1 | 8/2002 | Lee | |
| 6,441,988 B2 | 8/2002 | Kang et al. | |
| 6,445,531 B1 | 9/2002 | Gaertner et al. | |
| 6,535,358 B1 | 3/2003 | Hauert et al. | |
| 6,597,529 B1 | 7/2003 | DeRose | |
| 6,624,964 B1 | 9/2003 | Pirzadeh | |
| 6,791,785 B1 | 9/2004 | Messenger et al. | |
| 2002/0176202 A1* | 11/2002 | Yoshida et al. .......... | 360/78.06 |
| 2004/0075934 A1* | 4/2004 | Tan et al. ..................... | 360/75 |

* cited by examiner

*Primary Examiner*—Andrew L. Sniezek
(74) *Attorney, Agent, or Firm*—Howard H. Sheerin, Esq.

(57) ABSTRACT

A disk drive is disclosed comprising a disk and a voice coil motor (VCM) for rotating an actuator arm about a pivot in order to actuate a head over the disk. During a park operation, a latching characteristic associated with latching the actuator arm is measured and used to configure a latching parameter that reduces acoustic noise. The latching parameter is used to latch the actuator arm by seeking the head to a latching track, maintaining the head over the latching track for a predetermined interval, applying an acceleration pulse to the VCM for an acceleration pulse period, applying a braking pulse to the VCM for a brake pulse period, and applying a latching current to the VCM.

18 Claims, 6 Drawing Sheets

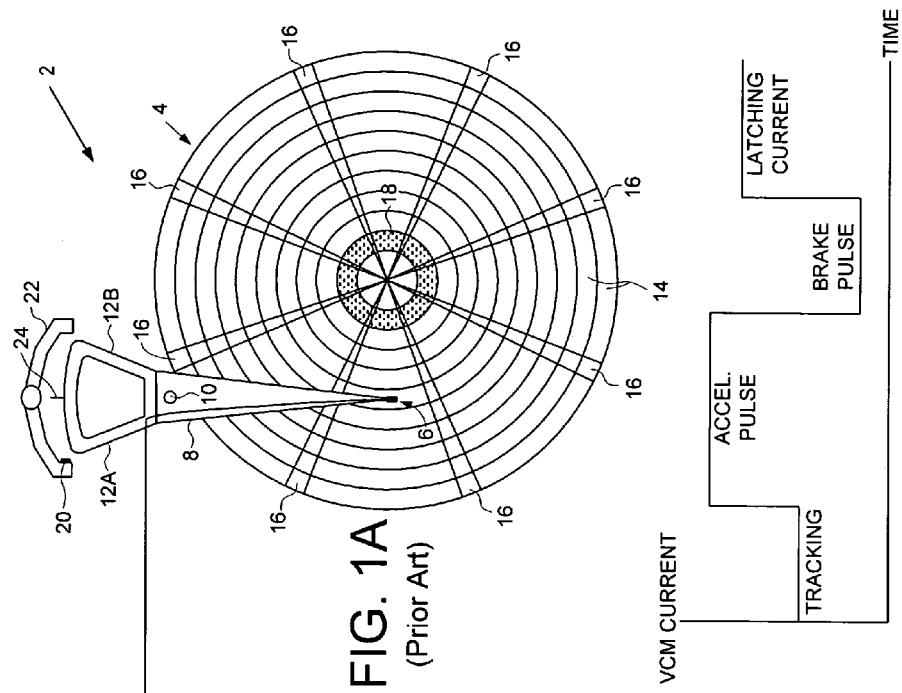
FIG. 1A (Prior Art)
FIG. 1C
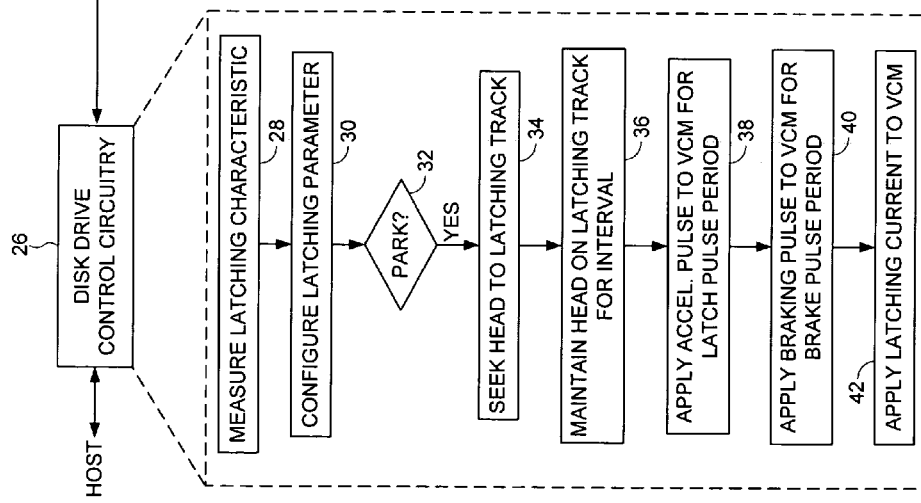
FIG. 1B

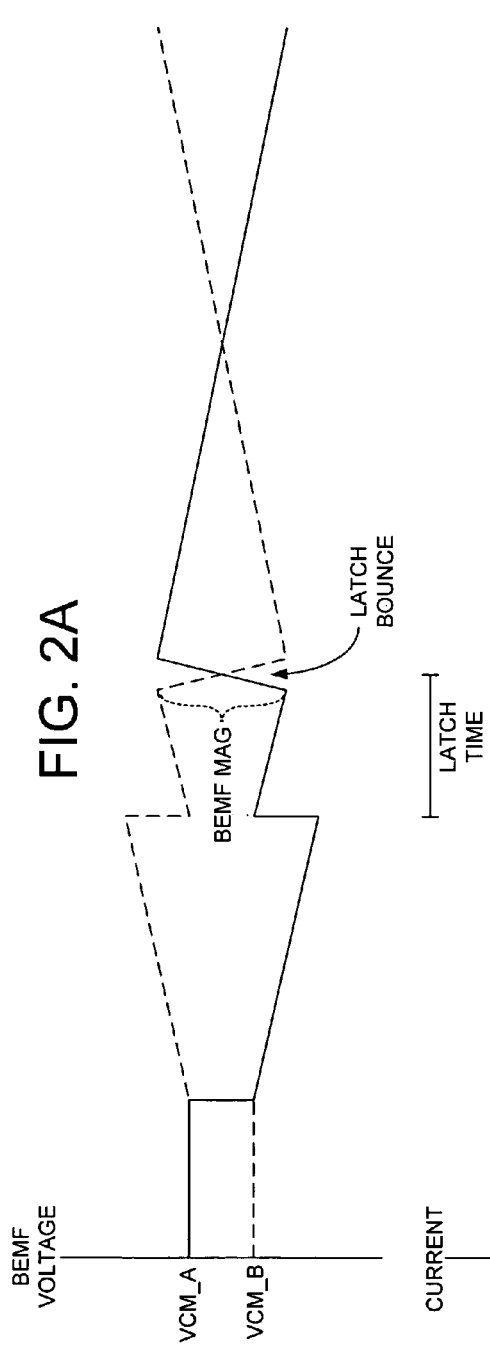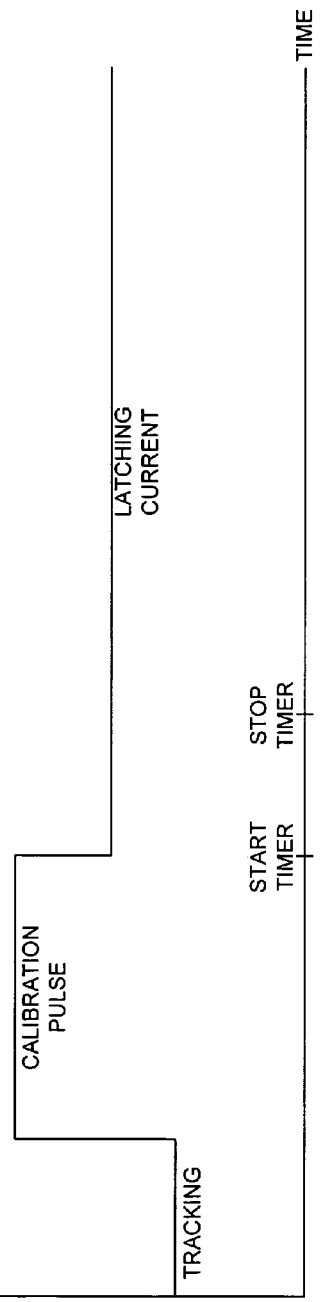

DISK DRIVE EMPLOYING A CALIBRATED BRAKE PULSE TO REDUCE ACOUSTIC NOISE WHEN LATCHING AN ACTUATOR ARM

BACKGROUND OF THE INVENTION

1. Field of the Invention

The present invention relates to disk drives for computer systems. More particularly, the present invention relates to a disk drive employing a calibrated brake pulse to reduce acoustic noise when latching an actuator arm.

2. Description of the Prior Art

FIG. 1A shows a prior art disk drive 2 comprising a disk 4 and a head 6 actuated over the disk 4 by a voice coil motor (VCM). The head 6 is connected to the distal end of an actuator arm 8 which is rotated about a pivot 10 in order to actuate the head 6 radially over the disk 4. The VCM comprises a voice coil attached to the actuator arm 8 having a first leg 12A and a second leg 12B for conducting current in a clockwise or counterclockwise direction thereby generating a magnetic flux which interacts with the magnetic field of permanent magnets (not shown) to generate a torque to rotate the actuator arm 8 about the pivot 10 in a clockwise or counterclockwise direction. The disk 4 comprises a plurality of tracks 14 defined by a plurality of embedded servo sectors 16, wherein disk drive control circuitry processes the embedded servo sectors 16 in order to seek the head 6 to a target track and maintain the head 6 over the target track during read/write operations.

When the disk drive is powered down (or otherwise idle), the disk drive control circuitry will perform a park operation wherein the head 6 is parked and the actuator arm 8 is latched. In the embodiment of FIG. 1A, the head 6 is parked on a landing zone 18 by rotating the actuator arm 8 in the counterclockwise direction. While the head 6 is parked, the actuator arm 8 is "latched" to prevent it from rotating the head 6 away from the landing zone 18. In the embodiment of FIG. 1A, a magnet 20 attached to a crash stop 22 attracts and holds a metal tang 24 attached to the actuator arm 8.

A problem with using a magnet as a passive latching mechanism is the undesirable acoustic noise generated when the tang 24 collides with the magnet 20 (or the crash stop 22 if the magnet 20 is embedded into the crash stop 22). A prior art technique for latching the actuator arm 8 applies a constant latching current to the voice coil to accelerate the actuator arm 8 until it latches. As the tang 24 approaches the magnet 20, the exponential increase in the force of the magnet and the corresponding increase in the acceleration of the actuator arm 8 further exacerbate the acoustic noise when the tang 24 collides with the magnet 20.

U.S. Pat. No. 6,441,987 discloses a technique for latching the actuator arm 8 by applying an alternating latching current (e.g., a square wave) to the voice coil instead of a constant latching current which reduces the acceleration of the actuator arm 8 as the tang 24 moves toward the magnet 20. However, the characteristics of the alternating latching current remain constant (e.g., constant duty cycle) throughout the latching operation which means a certain amount of undesirable acoustic noise will still occur when the tang 24 collides with the magnet 20.

There is, therefore, a need to reduce acoustic noise in a disk drive when latching the actuator arm.

SUMMARY OF THE INVENTION

The present invention may be regarded as a disk drive comprising a disk having a plurality of tracks, a head attached to a distal end of an actuator arm, and a voice coil motor (VCM) for rotating the actuator arm about a pivot to actuate the head over the disk. Disk drive control circuitry measures a latching characteristic associated with latching the actuator arm and configures a latching parameter in response to the measured latching characteristic, the latching parameter for reducing acoustic noise when latching the actuator arm. The latching parameter is used to latch the actuator arm by seeking the head to a latching track, maintaining the head over the latching track for a predetermined interval, applying an acceleration pulse to the VCM for an acceleration pulse period, applying a braking pulse to the VCM for a brake pulse period, and applying a latching current to the VCM.

In one embodiment, the latching parameter is selected from the group consisting of an amplitude of the acceleration pulse, the acceleration pulse period, an amplitude of the braking pulse, and the brake pulse period.

In another embodiment, an average tracking current applied to the VCM is measured while maintaining the head over the latching track for the predetermined interval. The acceleration pulse is adjusted in response to the average tracking current.

In yet another embodiment, the actuator arm comprises a voice coil and the latching characteristic associated with latching the actuator arm comprises a back EMF voltage generated by the voice coil.

In another embodiment, the latching characteristic associated with latching the actuator arm comprises a latch time requited to latch the actuator arm. In one embodiment, the latch time is determined by seeking the head to the latching track, applying a calibration pulse to the VCM for a calibration pulse period, detecting when the actuator arm latches, and measuring the latch time as the time between the end of the calibration pulse period and when the actuator arm latches. In one embodiment, the actuator arm comprises a voice coil comprising a first and second leg and the actuator arm latch event is detected by evaluating a back EMF voltage generated by the first and second legs of the voice coil.

In still another embodiment, the latching characteristic changes as a temperature of the VCM changes. By estimating the temperature of the VCM during normal operation, the latching parameter can be adjusted in response to the estimated temperature of the VCM. In one embodiment, the latching characteristic associated with latching the actuator arm is measured for at least two VCM temperature settings (e.g., during manufacturing). In this manner a custom correlation between the VCM temperature and the latching parameter can be generated for each individual product disk drive.

The present invention may also be regarded as a method of correlating a latching characteristic associated with latching an actuator arm in a disk drive with a latching parameter that reduces acoustic noise. The disk drive comprises a disk having a plurality of tracks, a head attached to a distal end of the actuator arm, and a voice coil motor (VCM) for rotating the actuator arm about a pivot to actuate the head over the disk. The head is positioned over a latching track and maintained over the latching track for a first predetermined interval. A calibration pulse is applied to the VCM for a calibration pulse period, and a latching characteristic associated with the actuator arm latching is measured. The head is then repositioned over the latching track and maintained over the latching track for a second predetermined interval. An acceleration pulse is applied to the VCM for an acceleration pulse period and a brake pulse is applied to the VCM for a braking pulse period. A latching current is then applied to the VCM to latch the actuator arm while measuring the acoustic noise. The latching parameter is adjusted, the actuator arm re-latched, and the acoustic noise re-measured. After a number of iterations, the latching parameter is selected that minimizes the acoustic noise and stored together with the latching characteristic.

BRIEF DESCRIPTION OF THE DRAWINGS

FIG. 1A shows a prior art disk drive comprising a disk, a head actuated over the disk by an actuator arm, and a magnetic latch for latching the actuator arm.

FIG. 1B shows a flow diagram according to an embodiment of the present invention for latching the actuator arm using a latching parameter that reduces acoustic noise.

FIG. 1C is a waveform of the VCM current when latching the actuator arm including a tracking current, an acceleration current, a braking current, and a latching current according to an embodiment of the present invention.

FIGS. 2A-2B show waveforms representing the VCM BEMF voltage and VCM current wherein the latching characteristic may comprise the magnitude of the BEMF voltage when the actuator arm latches or the latch time required to latch the actuator arm.

DESCRIPTION OF THE PREFERRED EMBODIMENTS

Figure 3A:
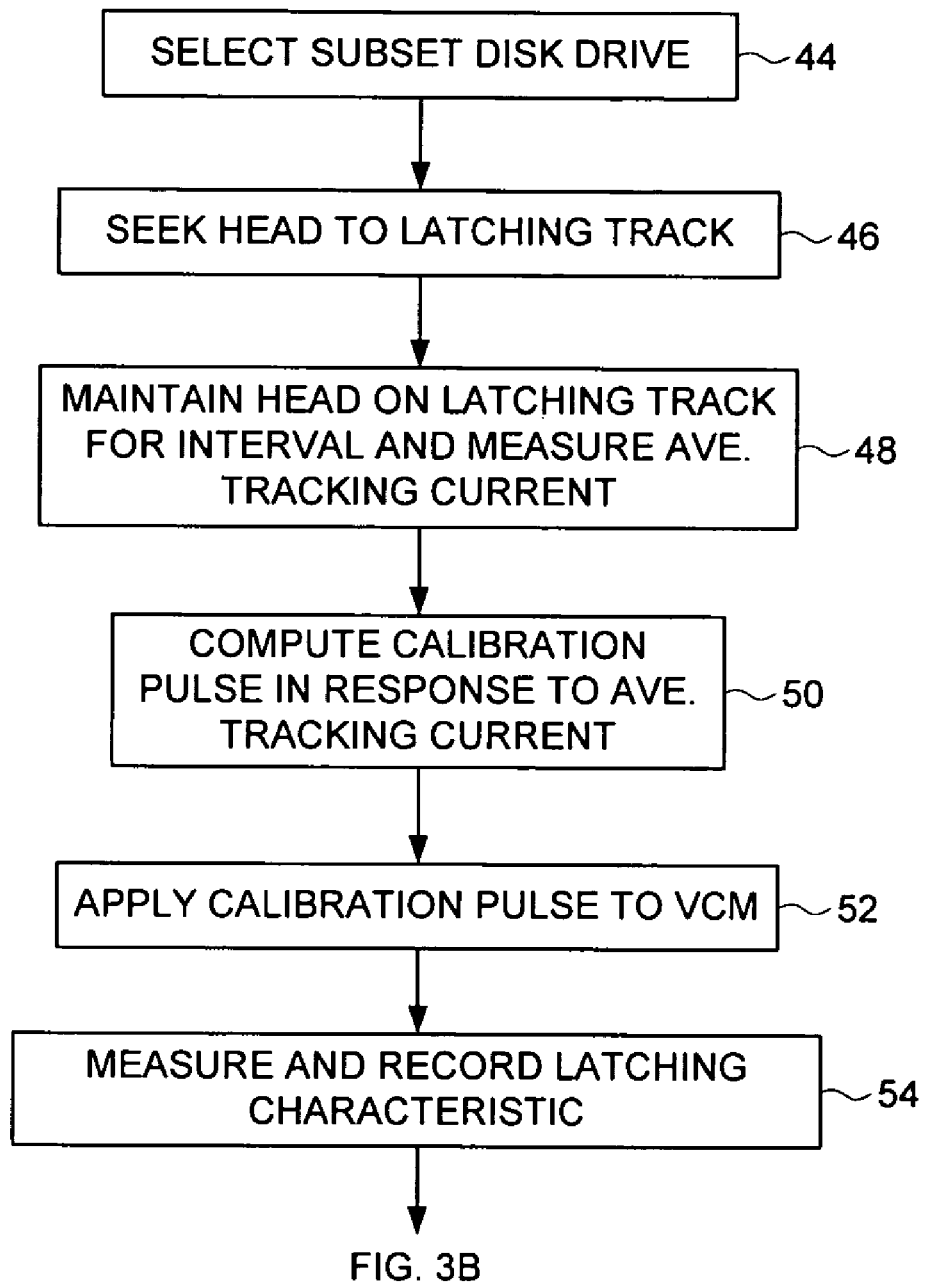
FIGS. 3A-3B show a flow diagram according to an embodiment of the present invention for correlating a latching characteristic associated with latching an actuator arm in a disk drive with a latching parameter that reduces acoustic noise.

FIGS. 1A-1C illustrate a disk drive 2 according to the present invention comprising a disk 4 having a plurality of tracks 14, a head 6 attached to a distal end of an actuator arm 8, and a voice coil motor (VCM) for rotating the actuator arm 8 about a pivot 10 to actuate the head 6 over the disk 4. Disk drive control circuitry 26 executes the flow diagram shown in FIG. 1B to latch the actuator arm 8. At step 28, a latching characteristic associated with latching the actuator arm 8 is measured, and at step 30 a latching parameter is configured in response to the measured latching characteristic, wherein the latching parameter for reducing acoustic noise when latching the actuator arm 8. If at step 32 the disk drive control circuitry 26 needs to park the head 6 (e.g., during power down or idle), then at step 34 the head 6 is positioned over a latching track, and at step 36 maintained over the latching track for a predetermined interval. At step 38 an acceleration pulse is applied to the VCM for an acceleration pulse period, at step 40 a braking pulse is applied to the VCM for a brake pulse period, and at step 42 a latching current is applied to the VCM.

FIG. 1C illustrates the VCM current while latching the actuator arm 8, including the tracking current while maintaining the head 6 over the latching track, the acceleration pulse for accelerating the actuator arm 8 toward the latch (the tang 24 toward the magnet 20), the brake pulse which counteracts the force of the magnet 20 and reduces the acceleration of the actuator arm 8 as the tang 24 contacts the magnet 20, and the latching current which ensures the actuator arm 8 remains in the latch while the vibrations dissipate. Since the characteristics related to the acoustic noise during the latching operation (e.g., strength of the VCM, strength of the magnet 20, latching distance, etc.) will vary from drive to drive, an aspect of the present invention is to adjust a latching parameter to modify the VCM current waveform of FIG. 1C in order to optimize the acoustic reducing benefit of using a braking pulse to counteract the force of the magnet 20. The latching parameter is adjusted in response to a latching characteristic measured for each particular disk drive. Any suitable latching parameter may be adjusted, and in one embodiment, the latching parameter is selected from the group consisting of an amplitude of the acceleration pulse, the acceleration pulse period, an amplitude of the braking pulse, and the brake pulse period.

Any suitable latching characteristic may be measured in order to adjust the latching parameter. In one embodiment, the actuator arm 8 comprises a voice coil having a first leg 12A and a second leg 12B, and the latching characteristic measured during the latching operation comprises the back EMF voltages generated by the legs of the voice coil. In an alternative embodiment, the latch time required to latch the actuator arm 8 is measured for each particular disk drive. The latching characteristic may be measured during manufacturing or alternatively while the disk drive is in the field.

FIG. 2A shows the back EMF (BEMF) voltage generated by the VCM as measured differentially between the first leg 12A and the second leg 12B of the voice coil, and FIG. 2B shows the current flowing through the voice coil during the latching operation. In this embodiment, the current applied to the voice coil includes a tracking current for maintaining the head 6 over the latching track for the predetermined interval, a calibration pulse for accelerating the actuator arm 8 toward the latch, and a latching current. When the calibration pulse is applied to the voice coil, the BEMF voltages begin to increase as the velocity of the VCM increases. When the calibration pulse is turned off, the BEMF voltages decrease and then again begin to increase as the force of the magnet 20 pulls the actuator arm 8 toward the latch thereby increasing the velocity of the actuator arm 8. When the actuator arm 8 contacts the latch it bounces away in the opposite direction causing the BEMF voltages to reverse polarity.

In one embodiment, the differential magnitude of the BEMF voltages across the first and second legs 12A and 12B just prior to the BEMF voltages reversing polarity (just prior to the actuator arm 8 contacting the latch) is measured as the latching characteristic for adjusting the latching parameter. In an alternative embodiment, the time required to latch the actuator arm 8 is measured as the latching characteristic for adjusting the latching parameter. This embodiment is described with reference to the flow diagram of FIGS. 3A-3B which also show an embodiment of the present invention for correlating the latching characteristic with the latching parameter that reduces acoustic noise.

At step 44 a subset disk drive is selected from a family of disk drives for measuring the latching characteristic. At step 46, the head 6 is positioned over the latching track, and at step 48, maintained over the latching track for a predetermined interval (e.g., a predetermined number of revolutions) while measuring the average tracking current. The average tracking current reflects the biasing forces on the actuator arm 8 such as the biasing force of the flex cable. In one embodiment, the average tracking current is subtracted from the calibration/acceleration pulses applied to the VCM. In this manner a nominal calibration/acceleration current is applied to the VCM so that the actuator arm 8 accelerates toward the latch with a nominal force independent of the biasing forces. At step 50 a calibration pulse (FIG. 2B) is computed in response to the average tracking current, and at step 52 the calibration pulse is applied to the VCM. At step 54 the latching characteristic is measured for the subset disk drive, such as the latch time. Referring again to FIG. 2B, the latch time is measured as the time between the end of the calibration pulse period and when the actuator arm 8 latches. The actuator arm 8 latches when the back EMF voltage (FIG. 2A) generated by the VCM as measured differentially between the first and second legs 12A and 12B of the voice coil reverses polarity.

Figure 3B:
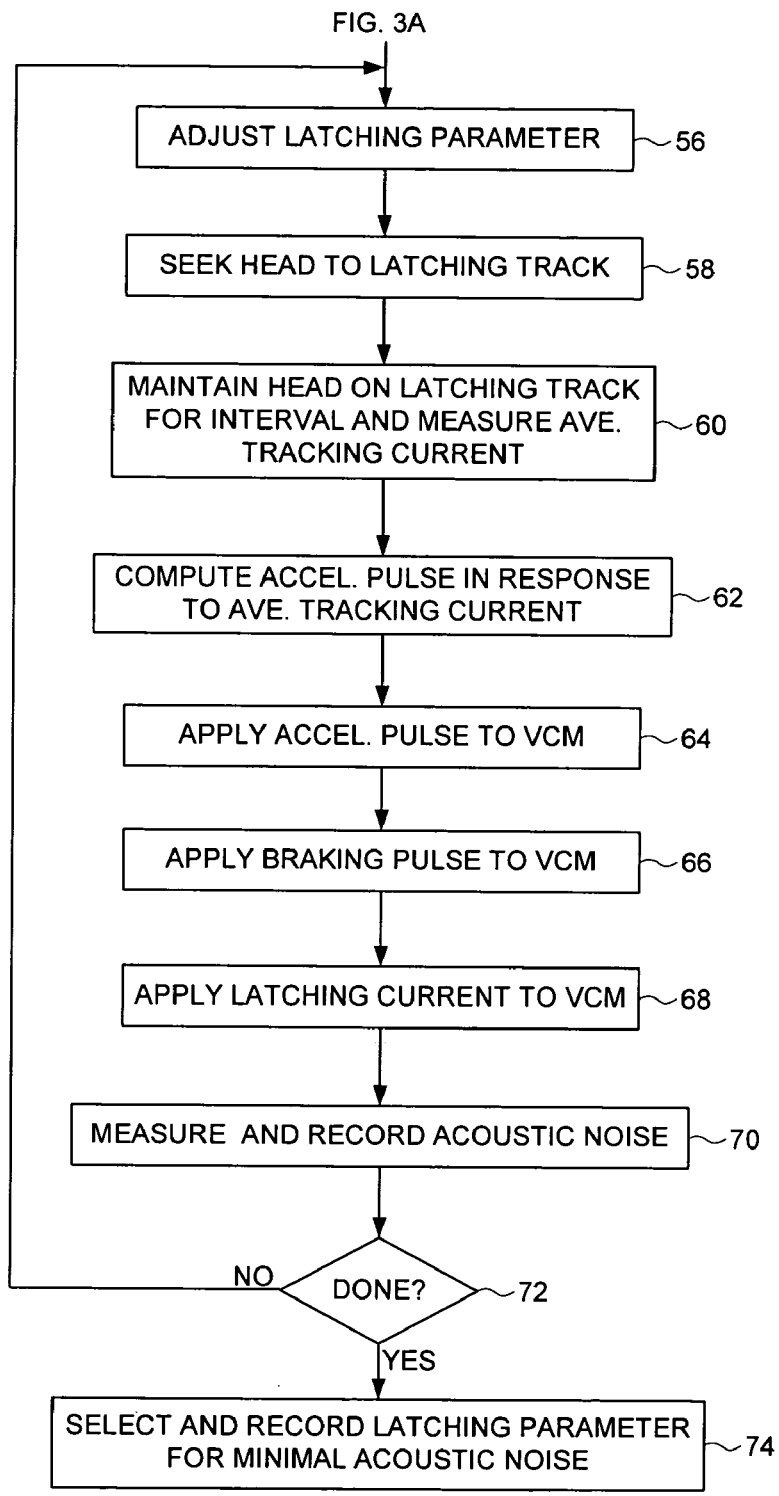

After measuring the latching characteristic for the subset disk drive, the latching parameter which minimizes the acoustic noise for the latching characteristic is determined according to the flow diagram of FIG. 3B. At step 56 the latching parameter is adjusted (initialized on the first iteration) such as adjusting the acceleration pulse period of the acceleration pulse (FIG. 1C). At step 58 the head 6 is positioned over the latching track, and at step 60, maintained over the latching track for a predetermined interval while measuring the average tracking current. At step 62 the acceleration pulse (e.g., magnitude) is computed in response to the average tracking current so that a nominal acceleration current is applied to the VCM. At step 64 the acceleration pulse is applied to the VCM for the acceleration pulse period, and at step 66 the brake pulse is applied to the VCM for the brake pulse period. At step 70 the acoustic noise generated when the actuator arm 8 contacts the latch is measured and recorded. If at step 72 there are more latching parameter values to try, the process is repeated starting at step 56 by adjusting the latching parameter to a different value. Once all of the latching parameter values have been tested, the latching parameter value which minimizes the acoustic noise measured at step 70 is selected and recorded together with the latching characteristic at step 74.

The flow diagrams of FIGS. 3A-3B are repeated for a number of subset disk drives, wherein each subset disk drive will typically have a different latching characteristic. This provides a number of data points for correlating the latching characteristic with the optimal latching parameter. In one embodiment, a suitable algorithm is employed (e.g., curve fitting) to correlate the latching characteristic with the latching parameter given the data points generated from executing the flow diagrams of FIGS. 3A-3B for the subset of disk drives. In one embodiment, a table is generated and stored in each product disk drive wherein the table is indexed by the latching characteristic. During manufacturing, the latching characteristic of each product disk drive is measured (step 28 of FIG. 1B) and used to index the table to select the optimal latching parameter (step 30 of FIG. 1B). In an alternative embodiment, coefficients of a polynomial are stored in each product disk drive wherein the latching characteristic is used as the argument for the polynomial to generate the optimal latching parameter.

Figure 4:
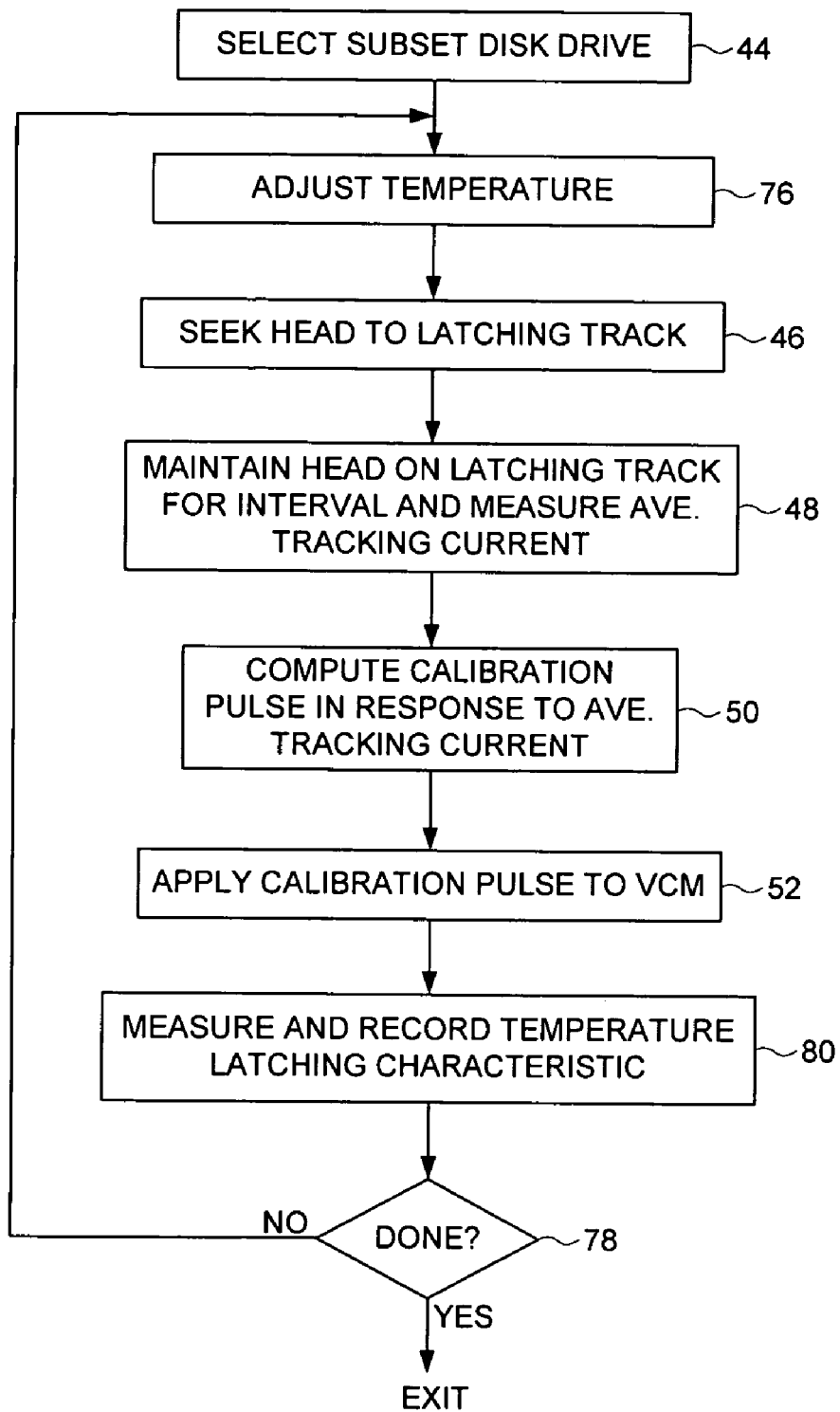
FIG. 4 shows a flow diagram according to an embodiment of the present invention for correlating a change in VCM temperature and the corresponding change in the latching characteristic.

The latching characteristic of the disk drive may vary with changes in VCM temperature. For example, the strength of the VCM may vary with temperature affecting the latch time. In one embodiment, the change in the latching characteristic is correlated with the change in the VCM temperature. This embodiment is illustrated in the flow diagram of FIG. 4 which is the same as the flow diagram of FIG. 3A with the additional steps of adjusting the VCM temperature at step 76 and repeating the process at step 78 for a number of different VCM temperature settings. At step 80 the VCM temperature setting and measured latching characteristic are recorded and used to derive the correlation between the two. The general correlation derived over the subset of disk drives is then used to adjust the latching parameter for each product disk drive. For a linear relationship, the latching characteristic changes by a scalar (slope of a line) as the VCM temperature deviates from a default manufacturing VCM temperature, and the latching parameter is adjusted accordingly. In one embodiment, the flow diagram of FIG. 3B is also executed for each VCM temperature setting to generate additional data points for correlating the latching characteristic with the optimal latching parameter.

In yet another embodiment, the correlation between the latching characteristics and VCM temperature is measured for each product disk drive during manufacturing rather than use a general correlation derived over a subset of disk drives. Referring again to FIG. 1B, the step 28 of measuring the latching characteristic of each product disk drive includes the step of measuring the latching characteristic for at least two VCM temperatures settings. In this manner a custom correlation (e.g., a custom slope in a linear relationship) between the latching characteristic and the VCM temperature can be generated for each product disk drive.

Figure 5:
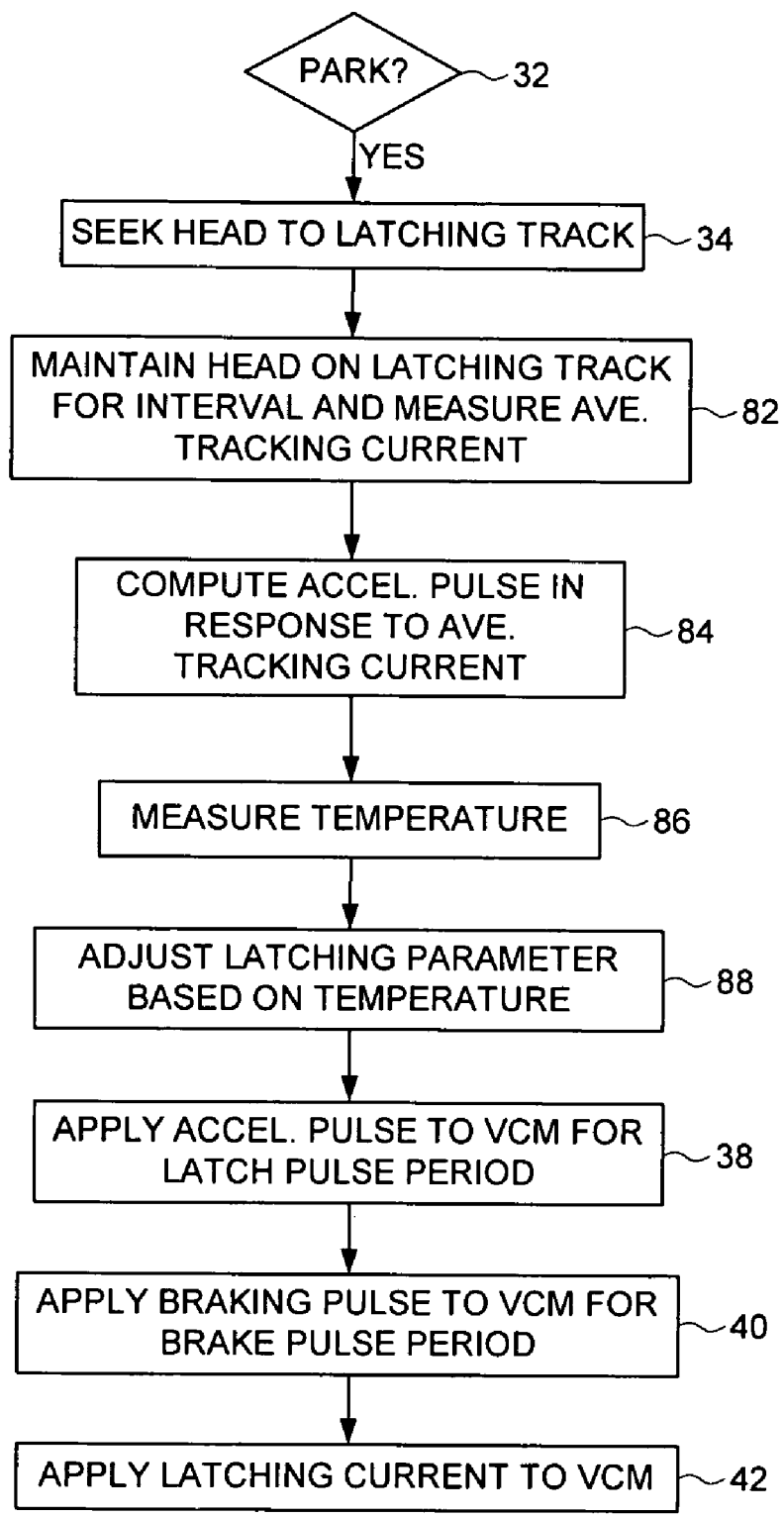
FIG. 5 shows a flow diagram according to an embodiment of the present invention wherein during normal operation of a disk drive the VCM temperature is estimated and used to adjust the latching parameter.

The flow diagram of FIG. 5 is similar to the flow diagram of FIG. 1B with additional steps to account for the biasing forces during tracking as well as the change in VCM temperature. At step 82 the head 6 is maintained over the latching track for the predetermined interval while measuring the average tracking current, and at step 84 the acceleration pulse (FIG. 1C) is computed in response to the average tracking current to compensate for the biasing forces during tracking (which also vary over time, for example, due to temperature fluctuations). At step 86 the temperature of the VCM is estimated using any suitable technique, and at step 88 the latching parameter is adjusted based on the estimated VCM temperature. In one embodiment, the latching characteristic for the estimated VCM temperature is determined (using the data points generated from the flow diagram of FIG. 4) and the latching parameter generated in response to the modified latching characteristic. In an alternative embodiment, the latching parameter is adjusted directly from the estimated VCM temperature using any suitable algorithm.

We claim:
1. A disk drive comprising:
 (a) a disk comprising a plurality of tracks;
 (b) a head attached to a distal end of an actuator arm;
 (c) a voice coil motor (VCM) for rotating the actuator arm about a pivot to actuate the head over the disk; and
 (d) disk drive control circuitry for:
  measuring a latching characteristic associated with latching the actuator arm;
  configuring a latching parameter in response to the measured latching characteristic, the latching parameter for reducing acoustic noise when latching the actuator arm; and
  using the latching parameter to latch the actuator arm by:
   seeking the head to a latching track;
   maintaining the head over the latching track for a predetermined interval;

applying an acceleration pulse to the VCM for an acceleration pulse period;
applying a braking pulse to the VCM for a brake pulse period; and
applying a latching current to the VCM.

2. The disk drive as recited in claim 1, wherein the latching parameter is selected from the group consisting of an amplitude of the acceleration pulse, the acceleration pulse period, an amplitude of the braking pulse, and the brake pulse period.

3. The disk drive as recited in claim 1, wherein the disk drive control circuitry for:
(a) measuring an average tracking current applied to the VCM while maintaining the head over the latching track for the predetermined interval; and
(b) adjusting the acceleration pulse in response to the average tracking current.

4. The disk drive as recited in claim 1, wherein:
(a) the actuator arm comprises a voice coil; and
(a) the latching characteristic associated with latching the actuator arm comprises a back EMF voltage generated by the voice coil.

5. The disk drive as recited in claim 1, wherein the latching characteristic associated with latching the actuator arm comprises a latch time required to latch the actuator arm.

6. The disk drive as recited in claim 5, wherein the disk drive control circuitry measures the latch time by:
(a) seeking the head to the latching track;
(b) applying a calibration pulse to the VCM for a calibration pulse period;
(c) detecting when the actuator arm latches; and
(d) measuring the latch time as the time between the end of the calibration pulse period and when the actuator arm latches.

7. The disk drive as recited in claim 6, wherein:
(a) the actuator arm comprises a voice coil comprising a first and second leg; and
(b) the disk drive control circuitry detects when the actuator arm latches by evaluating a back EMF voltage generated by the first and second legs of the voice coil.

8. The disk drive as recited in claim 1, wherein:
(a) the latching characteristic changes as a temperature of the VCM changes;
(b) the disk drive control circuitry estimates the temperature of the VCM; and
(c) the disk drive control circuitry adjusts the latching parameter in response to the estimated temperature of the VCM.

9. The disk drive as recited in claim 8, wherein the disk drive control circuitry for:
(a) measuring the latching characteristic associated with latching the actuator arm for at least two VCM temperature settings; and
(b) correlating the latching parameter with the VCM temperature.

10. A method of correlating a latching characteristic associated with latching an actuator arm in a disk drive with a latching parameter that reduces acoustic noise, the disk drive comprising a disk having a plurality of tracks, a head attached to a distal end of the actuator arm, and a voice coil motor (VCM) for rotating the actuator arm about a pivot to actuate the head over the disk, the method comprising the steps of:
(a) seeking the head to a latching track;
(b) maintaining the head over the latching track for a first predetermined interval;
(c) applying a calibration pulse to the VCM for a calibration pulse period;
(d) measuring the latching characteristic associated with the actuator arm latching;
(e) seeking the head to the latching track;
(f) maintaining the head over the latching track for a second predetermined interval;
(g) applying an acceleration pulse to the VCM for an acceleration pulse period;
(h) applying a braking pulse to the VCM for a brake pulse period;
(i) applying a latching current to the VCM;
(j) measuring the acoustic noise;
(k) adjusting the latching parameter;
(l) repeating steps (e) through (j) at least once;
(m) selecting the latching parameter that minimizes the acoustic noise measured in step (i); and
(n) storing the latching characteristic and the latching parameter.

11. The method as recited in claim 10, wherein the latching parameter is selected from the group consisting of an amplitude of the acceleration pulse, the acceleration pulse period, an amplitude of the braking pulse, and the brake pulse period.

12. The method as recited in claim 10, further comprising the steps of:
(a) measuring an average tracking current applied to the VCM while maintaining the head over the latching track for the first predetermined interval;
(b) adjusting the calibration pulse in response to the average tracking current.

13. The method as recited in claim 10, further comprising the steps of:
(a) measuring an average tracking current applied to the VCM while maintaining the head over the latching track for the second predetermined interval;
(b) adjusting the acceleration pulse in response to the average tracking current.

14. The method as recited in claim 10, further comprising the steps of:
(a) the actuator arm comprises a voice coil; and
(b) the latching characteristic associated with latching the actuator arm comprises a back EMF voltage generated by the voice coil.

15. The method as recited in claim 10, wherein the latching characteristic associated with latching the actuator arm comprises a latch time required to latch the actuator arm.

16. The method as recited in claim 15, wherein the latch time is measured by:
(a) seeking the head to the latching track;
(b) applying a calibration pulse to the VCM for a calibration pulse period;
(c) detecting when the actuator arm latches; and
(d) measuring the latch time as the time between the end of the calibration pulse period and when the actuator arm latches.

17. The method as recited in claim 16, wherein:
(a) the actuator arm comprises a voice coil comprising a first and second leg; and
(b) the step of detecting when the actuator arm latches comprises the step of evaluating a back EMF voltage generated by the first and second legs of the voice coil.

18. The method as recited in claim 10, wherein further comprising the step of adjusting a temperature of the VCM and repeating steps (a) through (d) at least once.

* * * * *